US010850865B2

(12) United States Patent
MacLean

(10) Patent No.: US 10,850,865 B2
(45) Date of Patent: Dec. 1, 2020

(54) MOBILE AIRCRAFT SECONDARY BARRIER CART

(71) Applicant: Gissel Flores MacLean, Leesburg, VA (US)

(72) Inventor: Robert James MacLean, Leesburg, VA (US)

( * ) Notice: Subject to any disclaimer, the term of this patent is extended or adjusted under 35 U.S.C. 154(b) by 0 days.

(21) Appl. No.: 16/836,842

(22) Filed: Mar. 31, 2020

(65) Prior Publication Data

US 2020/0223557 A1 Jul. 16, 2020

Related U.S. Application Data

(63) Continuation-in-part of application No. 15/799,391, filed on Oct. 31, 2017, now Pat. No. 10,611,493.

(51) Int. Cl.
*B64D 11/04* (2006.01)
*B64D 45/00* (2006.01)
*F41H 5/14* (2006.01)

(52) U.S. Cl.
CPC .......... *B64D 45/0018* (2019.08); *B64D 11/04* (2013.01); *B64D 45/0021* (2019.08); *F41H 5/14* (2013.01)

(58) Field of Classification Search
CPC ....... B64C 1/14; B64C 1/1407; B64C 1/1415; B64C 1/1423; B64C 1/1446; B64C 1/1461; B64C 1/1469; B64C 9/00; B64C 45/0015; B64C 2045/005; E06B 9/01; E06B 9/02; E06B 9/0692; E06B 2009/002

USPC ............ 244/118.5, 121; 160/351, 354, 368.1
See application file for complete search history.

(56) References Cited

U.S. PATENT DOCUMENTS

| | | | | |
|---|---|---|---|---|
| 4,869,445 A * | 9/1989 | Jones | ....................... | B64D 9/00 244/118.1 |
| 4,909,004 A * | 3/1990 | Panttila | ..................... | E06B 9/00 160/114 |
| 5,393,013 A * | 2/1995 | Schneider | .......... | B64D 11/0023 160/351 |
| 5,597,028 A * | 1/1997 | Rolf | ....................... | B60J 1/2011 160/354 |
| 6,474,599 B1 * | 11/2002 | Stomski | ................ | B64C 1/1469 109/68 |
| 6,523,779 B1 * | 2/2003 | Michel | ............... | B64D 11/0023 244/118.5 |
| 6,588,705 B1 * | 7/2003 | Frank | .................... | B64C 1/1469 244/118.5 |
| 2003/0006342 A1 * | 1/2003 | Page, Jr. | ............ | B64D 45/0015 244/118.5 |
| 2003/0169184 A1 * | 9/2003 | Manten | .............. | B64D 45/0015 340/945 |

(Continued)

*Primary Examiner* — Joshua E Rodden
(74) *Attorney, Agent, or Firm* — Steven M. War, Esq.

(57) ABSTRACT

A Mobile Aircraft Secondary Barrier Cart which includes a main housing, with at least two retractable and expandable rigid barriers or a soft non-porous curtain that rise up from the main housing and encompass the entire forward galley/main cabin entrance and locks into place. The rigid barriers, when present, generally wedge into a female channel surrounding forward galley/main cabin entrance to hold the rigid barriers in placed. The purpose of the Mobile Aircraft Secondary Barrier Cart and the included curtain is to prevent unauthorized individuals from entering the Flightdeck when it is unlocked during flight.

19 Claims, 3 Drawing Sheets

(56) References Cited

U.S. PATENT DOCUMENTS

| | | | |
|---|---|---|---|
| 2004/0094667 A1* | 5/2004 | D'Alvia | B64D 45/0015 |
| | | | 244/118.5 |
| 2004/0188565 A1* | 9/2004 | Egeresi | G08B 15/007 |
| | | | 244/118.5 |
| 2006/0000946 A1 | 1/2006 | Garofani et al. | |
| 2006/0054741 A1* | 3/2006 | Mills | B64D 11/00 |
| | | | 244/118.5 |
| 2010/0219291 A1* | 9/2010 | Guering | B64D 9/00 |
| | | | 244/118.5 |
| 2011/0156439 A1 | 6/2011 | Sakata | |
| 2013/0139979 A1 | 6/2013 | Zheng | |
| 2013/0168033 A1 | 7/2013 | Dier et al. | |
| 2017/0009504 A1 | 1/2017 | Colacecchi | |
| 2017/0009518 A1 | 1/2017 | Carter | |
| 2017/0328075 A1* | 11/2017 | Conners | E04G 21/3266 |

\* cited by examiner

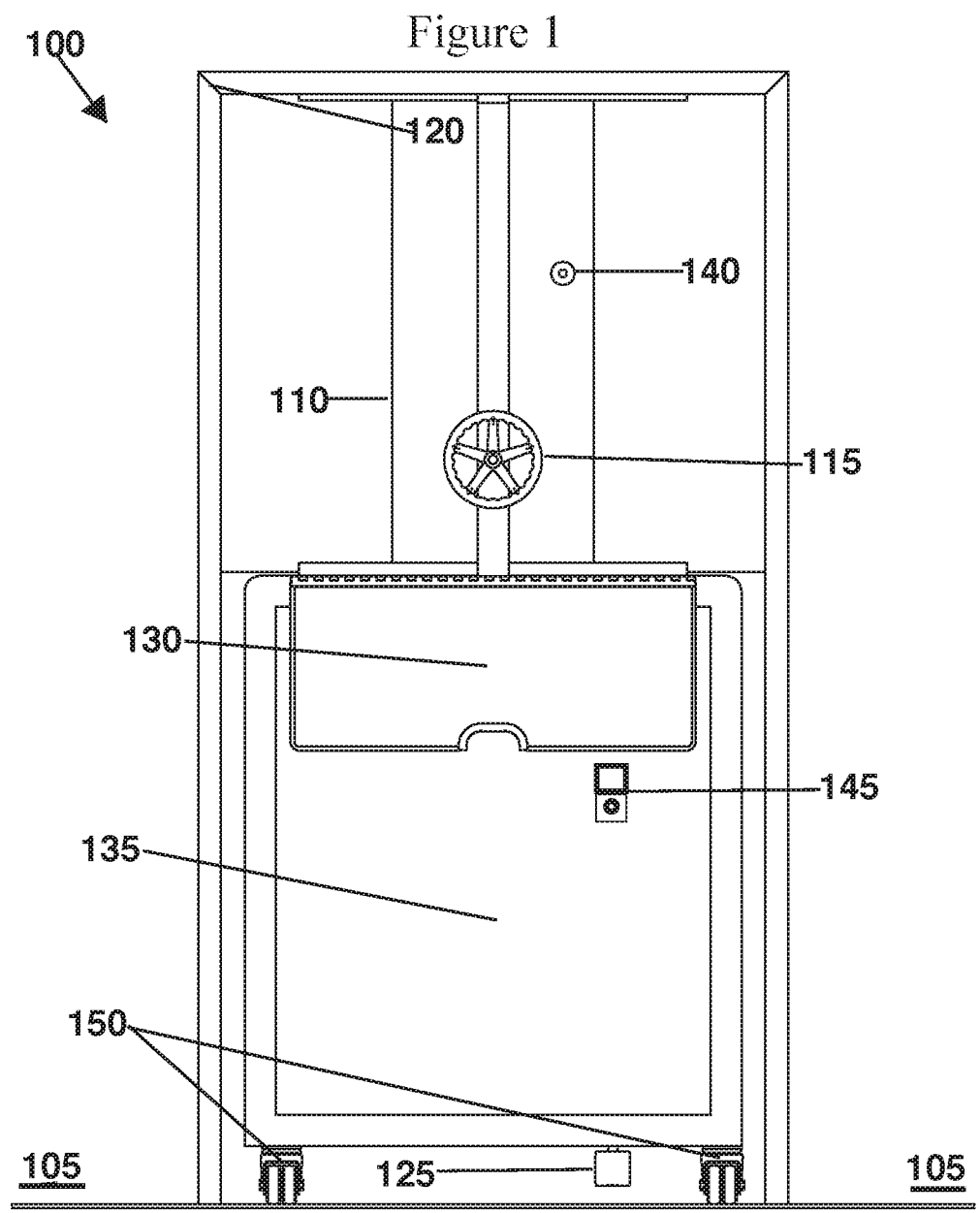

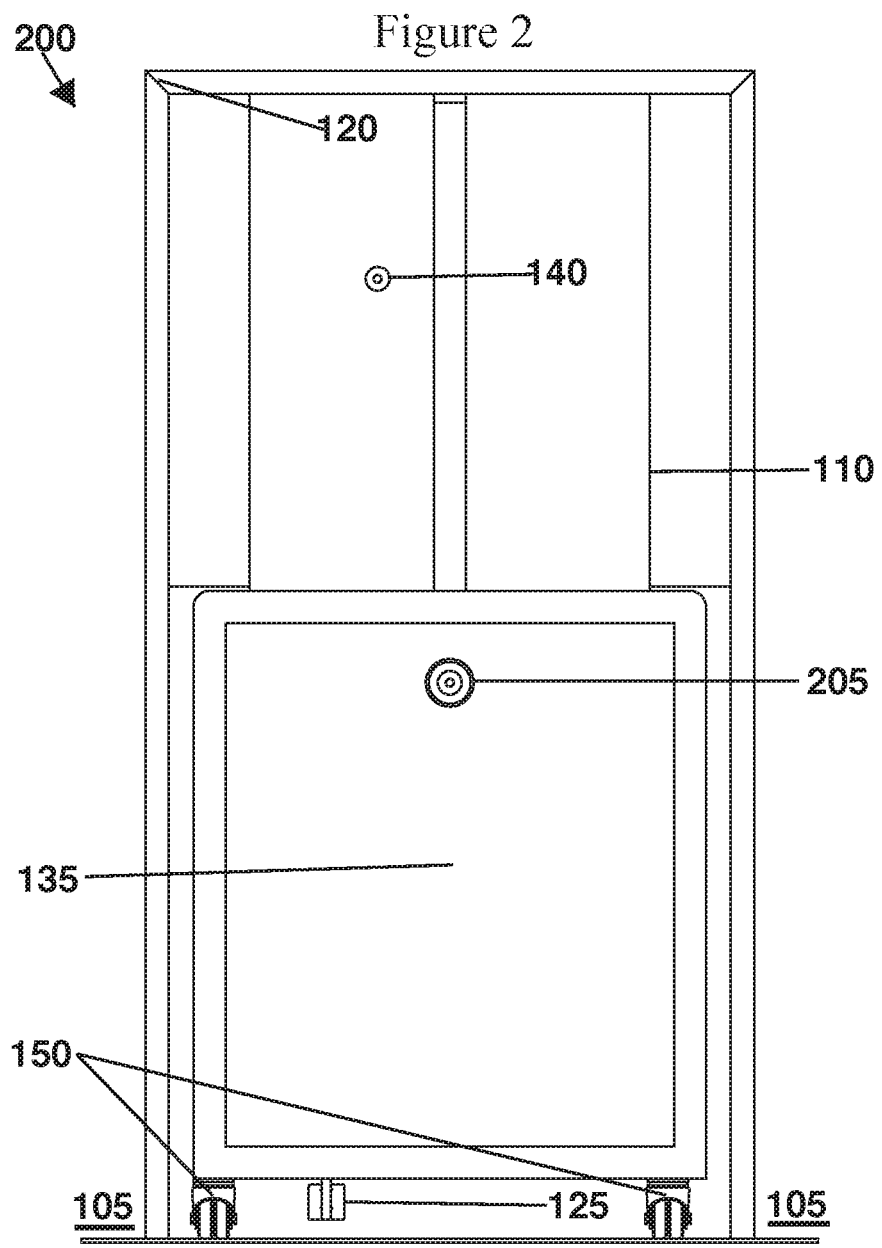

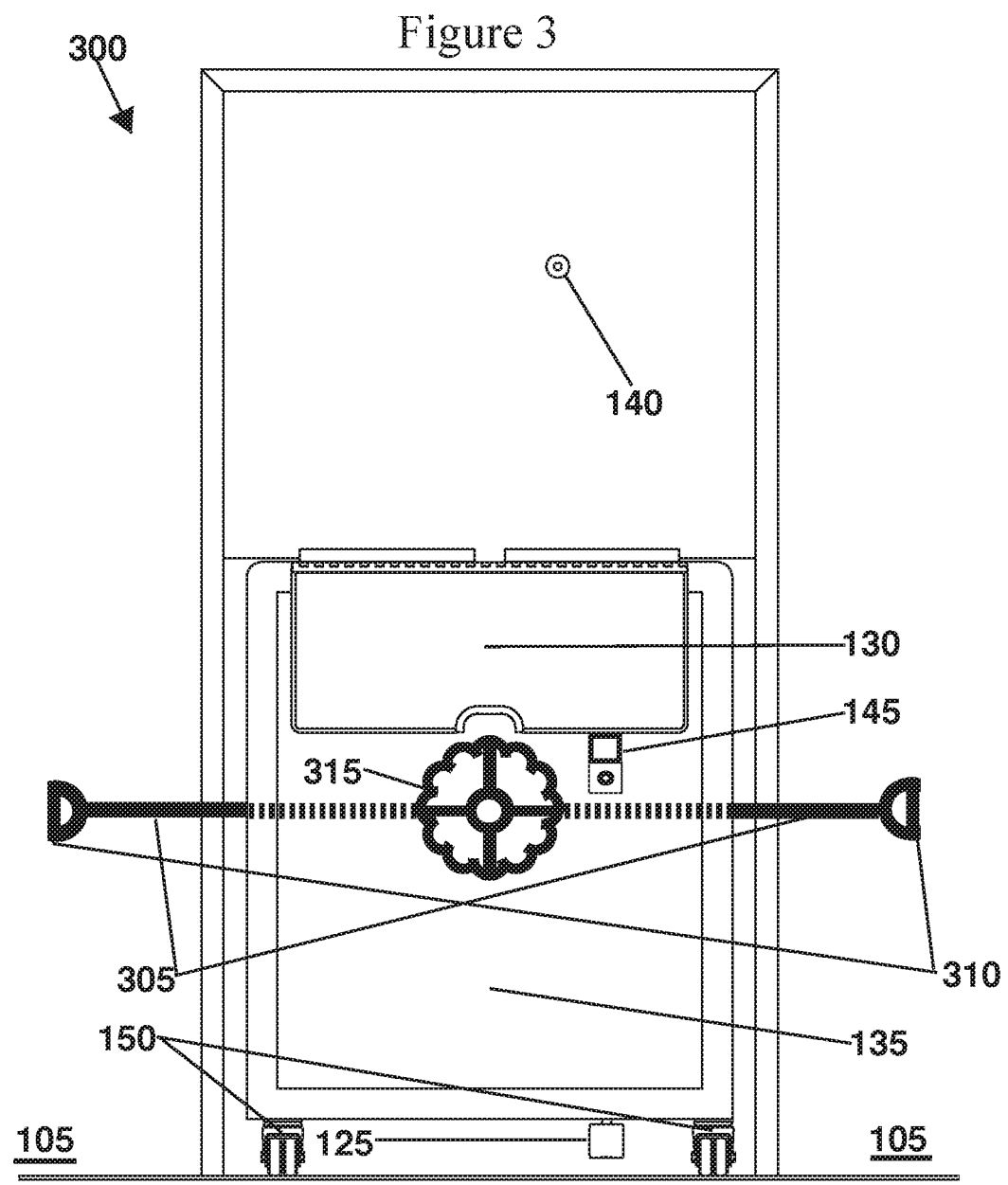

MOBILE AIRCRAFT SECONDARY BARRIER CART

FIELD OF THE INVENTION

A Mobile Aircraft Secondary Barrier Cart ("MASBC"), also known as an Anti-Terrorism/Anti-Personnel Mobile Commercial Passenger Aircraft Physical Flightdeck or Mobile Cockpit Secondary Barrier Gallery Cart, is used to prevent an individual from sprinting and diving into the Flightdeck (or cockpit") of a commercial passenger aircraft while the cockpit door is routinely opened during flight. The present invention is particularly aimed at security of commercial aircraft while in flight.

RELATED APPLICATION

This application is a continuation-in-part of co-pending U.S. patent application Ser. No. 15/799,391 filed on Oct. 31, 2017. U.S. patent application Ser. No. 15/799,391 is incorporated by reference herein in its entirety.

BACKGROUND

Unfortunately, solo suicidal terrorist attacks, also known as "lone-wolf attacks," are becoming more common daily. "Lone-wolf attacks" are delivered by such means as Improvised Explosive Devices (IED) worn on the body of an attacker, or contained in a vehicle which is then driven into a crowd of victims.

Suicidal "lone-wolf attacks" on commercial passenger aircraft (aircraft) are a very real threat because of the inability of detection by airport security screening machines, airport screeners, law enforcement, and the Intelligence Community. Firearms pose less of a threat than IEDs because of the detectable metallic parts of firearms, the attacker's fear of extinguishing all of the ammunition and then being restrained, and the limited killing ability of a standard semiautomatic pistol's 18 rounds. Building, hiding, and smuggling IEDs requires special material, numerous experts, and planning. A major operation involving multiple individuals is likely to be detected.

Unlocked Flightdecks are also vulnerable to chemical attacks therefore the best secondary barrier system is non-porous.

After the Sep. 11, 2001 terrorist attacks (9/11), a pilot will not risk total destruction of the aircraft by unlocking the Flightdeck under duress.

Sprinting and diving into a Flightdeck, also known as a "cockpit," only needs one attacker and one opportunity when a pilot enters the cabin during flight to use the lavatory, obtain sustenance, crew-rest, or inspect the surface of the aircraft's wings.

BRIEF SUMMARY OF THE INVENTION

Currently most commercial passenger aircraft (aircraft) do not have a secondary barrier system to prevent an individual from sprinting and diving into an unlocked Flightdeck during flight. A secondary barrier system is preferably non-porous to protect against chemical attacks on unlocked Flightdecks. A mobile aircraft secondary barrier cart of the present invention is an effective means to prevent an individual from sprinting and diving into an unlocked commercial passenger aircraft Flightdeck in order to destroy the aircraft while in flight.

BRIEF DESCRIPTION OF THE DRAWINGS

In the drawings, like reference characters generally refer to the same parts throughout the different views. The drawings are not necessarily to scale, rather emphasis is generally being placed upon illustrating the principles of various embodiments. The foregoing and other aspects of the invention will be better understood from the following description of embodiments of the invention, by way of example only, and with reference to the accompanying drawings, in which:

FIG. 1 depicts a view from inside the forward galley when one embodiment of the rigid expandable panels MASBC is deployed and wedged into a female channel surrounding the forward galley/main cabin entrance;

FIG. 2 depicts a view from the passenger cabin (main cabin) when a second embodiment of a rigid expandable panels MASBC is deployed and wedged into a female channel surrounding the forward galley/main cabin entrance; and FIG. 3 depicts a view from the passenger cabin (main cabin) when a third embodiment, the non-porous soft curtain MASBC, is deployed.

DETAILED DESCRIPTION OF THE INVENTION

Technical Problem

Most commercial passenger aircraft do not have a secondary barrier system to prevent an individual from sprinting and diving into an unlocked Flightdeck in order to destroy the aircraft while in flight.

Unlocked Flightdecks are also vulnerable to chemical attacks therefore the best secondary barrier system is non-porous.

Despite 9/11, air carriers do not build Flightdeck secondary barriers into the vast majority of newly manufactured aircraft. Until there is a regulatory or legal mandate to build barriers into brand new cabins, thousands of existing aircraft cannot be cost effectively retrofitted. Section 336 of the FAA Reauthorization Act of 2018 mandates Flightdeck secondary barriers on aircraft built after October 2019.

A Mobile Aircraft Secondary Barrier Cart ("MASBC") is needed to stop an attacking individual for at least five seconds so that a pilot can close the Flightdeck door and emergency land the aircraft. Due to mandate enacted after 9/11, 14 Code of Federal Regulations Section 25.795, all Flightdeck doors can withstand-a strong individual trying to break it down-long enough to emergency land. However, pilots need to unlock the reinforced Flightdeck doors during flight in order to check for potential wing problems (i.e., flaps not extended or withdrawn), crew changes for sleep or rest during long flights, meals, and to use the lavatory.

A MASBC is a perfectly effective inflight security invention and is a relatively inexpensive mobile commercial passenger aircraft galley cart physical secondary barrier to stop an individual from sprinting and diving into an unlocked Flightdeck in order to destroy it during flight. In addition, the MASBC of the present invention requires only minimal modifications to aircraft already in the field.

Inward-opening Flightdeck doors, that open away from the main passenger cabin, are exceptionally more vulnerable to an attack because the door swings against a pilot the moment he/she opens it. An attack on an outward-opening door, that opens away from the Flightdeck, gives a crew member the chance to use his/her backside to close it in which the frame reinforces the door. An attack on an outward-opening door Flightdeck requires the attacker to have to wedge himself between the door and the frame if he cannot dive into the Flightdeck semi-impeded or unimpeded.

Only spring-latches protect Flightdecks with an inward-opening door. There are approximately 1,187 existing aircraft with inward-opening doors.

Most aircraft that fly over large bodies of water are wide body (two aisles). It is more difficult to attack the Flightdeck on a wide-body aircraft than a single-aisle one due to the extra distance between the Flightdeck entrance and the first row in the cabin.

The existing Garofani Installed Physical Secondary Barrier (GGIPSB) system (Patent Publication No. US20060000946—Inventors Primo, Dante, and Renato Garofani) is expensive to manufacture, install, and maintain due to its relatively excessive weight and bulkiness, and the fact it has to be built into the aircraft. The GIPSB is normally installed in the busiest choke-point of the aircraft: to the right of the main aircraft entry door and inside of the forward galley entrance.

Once the GIPSB has been installed, it gets degraded after being subjected to usage during numerous flights and pilots exiting the Flightdeck. The GIPSB stows into the forward galley entrance causing it to protrude into the aisle hence causing it to be exposed to all of the passengers, luggage, and standard sustenance service trolley galley carts. Due to it being in the busiest transit area of the aircraft, the GIPSB also gets damaged by passengers accidentally hitting it with their carry-on luggage or the flight crew running into it with standard sustenance service trolley galley carts.

An inoperable GIPSB not only leaves the aircraft vulnerable to destruction, but it takes the aircraft out of service for an extended duration: While an GIPSB maintenance order is drafted and transmitted by an aircrew member, an GIPSB technician gets dispatched, a technician assesses the damage, a technician orders the GIPSB parts, the parts may have to be manufactured if not in stock, and finally, the time it takes to repair and/or replace the GIPSB. Because the GIPSB has to be glued, riveted, or screwed into the aircraft cabin, there also exists the potential of damage to the cabin which would also need repair.

An inoperable GIPSB takes an aircraft temporarily out of service and reduces air carriers' profits.

Another danger posed the GIPSB's very large main-housing attached to the cabin can collapse during severe turbulence or a hard-landing and prevent emergency egress through the aircraft's main chokepoint and exit.

Due to the GIPSB over-engineering, i.e. retractable cables and female/male locking mechanisms, air turbulence could also cause it to become inoperable during flight.

Due to a GIPSB being in the area of the highest passenger, carry-on luggage, and standard sustenance service trolley galley cart traffic that could accidentally damage and render it inoperable, it presents a vulnerability to the Flightdeck due to the fact it cannot be repaired or replaced until after landing.

Premeditating his attack, an attacker can chemically (glue) or mechanically sabotage a GIPSB while crew members and passengers are distracted, or when cabin lights are dimmed or off. Such an opportunity is likely while the attacker stands next to the GIPSB waiting to use the lavatory inside of the forward galley.

Most aircraft rely on the current inferior method of a flight attendant standing in front of the Flightdeck door to prevent unauthorized personnel from entering the cockpit. At times, a standard sustenance service trolley galley cart is also used in front (or behind) the flight attendant. There is also a reliance of government air marshals who are rarely on flights and when they are aboard, they cannot respond fast enough to an attacker sprinting and diving into the Flightdeck.

Between 2009 and 2011, the volunteer, non-profit organization, "Radio Technical Commission for Aeronautics" (RTCA) conducted a study and issued a report on Sep. 28, 2011 titled, "Aircraft Secondary Barriers and Alternative Flightdeck Security Procedures (RTCA DO-329)."

RTCA DO-329 concluded that not having a secondary barrier physically mounted or mechanically attached to the cabin could result in an attacker crashing an aircraft. The method of an aircrew member standing in front of a standard sustenance service trolley galley cart or no service trolley galley cart was defeated by padded-up role players who were likely unwilling to attack a simulated Flightdeck at full speed and strength and subject themselves to injury. The role-player U.S. Department of Homeland Security/Transportation Security Administration (TSA)/Federal Air Marshal Service (FAMS) Federal Air Marshals (FAM) also anticipated a sprint-dive-attack. FAMs in a real-world scenario are subjected to cabin noise, seat-belted, distracted with reading or watching video, or are taking an authorized nap.

The results of RTCA DO-329 were so disturbing, the TSA and the U.S. Department of Transportation/Federal Aviation Administration redacted the report and marked it as "SENSITIVE SECURITY INFORMATION."

Until Mar. 2, 2016, the unredacted RTCA DO-329 was withheld from TSA-FAMS Supervisory Federal Air Marshals in charge of field offices' training divisions, TSAFAMS trainers, and rank-and-file TSA FAMs who routinely fly protective missions while armed with firearms.

Four of the five role-player FAMs in the RTCA DO-329 study are supervisory or managerial FAMs, some of whom have since been promoted.

While the RTCA DO-329 invited air carrier representatives, and pilots and flight attendants union representatives, it did not invite any professional law enforcement non-union organizations who lobby on behalf of FAMs. Such organizations are the Fraternal Order of Police, the Federal Law Enforcement Officers Association, and the Air Marshal Association. FAMs cannot form common bargaining-unit unions that have contracts with U.S. Government agency senior leadership.

Due to human error, sometimes pilots exit and enter the Flightdeck without establishing any type of human or combination of human and standard sustenance galley cart barrier.

The RTCA DO-329 study concluded that an installed physical secondary barrier needs to only stop an attacker for at least five seconds so that a pilot can lock the reinforced Flightdeck door, begin emergency landing, and potentially armed himself/herself with a Federal Flightdeck Officer firearm in its locked container in the case the attacker breaches both the barrier and the door.

Solution to Problem

Mobile Aircraft-Secondary-Barrier-Cart (MASBC), also known as Anti-Terrorist Anti-Personnel Mobile Commercial Passenger Aircraft Physical Secondary Barrier Forward Galley Cart, is 100% effective in stopping an attack on the Flightdeck and is exceptionally more inexpensive than the GIPSB.

As proven by the RTCA DO-329 study, a Flightdeck installed physical secondary barrier does not need to be impenetrable, it only needs to stop an attacker for at least five seconds which is long enough for the pilot to lock the reinforced Flightdeck door and quickly emergency land. If the attacker attempts to break down the MASBC and the reinforced Flightdeck door, enough time will have elapsed for the pilot to unlock a Federal Flightdeck Officer firearm's container, load it with ammunition, and have it ready for a Flightdeck breach.

The MASBC looks very similar to a standard sustenance service trolley galley cart except that it locks into the forward galley entrance, its top opens, inside is an expandable rigid or fabric/net barrier, the barrier then can be folded out (rigid) and/or hung up to (fabric/net) the top portion of the forward galley entrance.

A rigid barrier is more advantageous to a soft curtain non-porous given its ability to wedge into a female channel surrounding the forward galley/main cabin entrance. A rigid system would not require hooks, rings, and retracting cables for deployment and stowage.

A commercial aircraft forward galley/main cabin entrance can be replaced by a MASBC. In the event of a malfunction, the MASBC can be instantly replaced after landing. The MASBC will not only save on government armed air marshal deployment costs, but will 100% eliminate the danger to aircraft Flightdecks—also known as cockpits—during inflight Flightdeck entries or exits during flight. Employing MASBC's on aircraft would also substantiate allowing more FAMs to detect "lone-wolf attackers," and conduct IED prevention, counterterrorism, and insider—threat search activities in our mass-transit centers.

The MASBC system is considerably less expensive than the GIPSB's due to the fact that the cabin would only need minimal alteration. In some embodiments, the expandable rigid barriers would wedge into a female channel surrounding the forward galley/main cabin entrance and lock the MASBC into place. In other embodiments, the MASBC's barrier is a non-porous curtain that locks into the ceiling in ways familiar to one of ordinary skill in the art and as described in copending U.S. patent application Ser. No. 15/799,391 which is herein incorporated by reference in its entirety.

Maintenance of the MASBC saves air carrier costs because it can be instantly replaced after landing without a technician, parts order, cabin repair, and the time needed to repair or replace a damaged or inoperable GIPSB.

The MASBC is stowed in the forward galley and cannot be damaged by passenger and equipment traffic.

The MASBC's main-housing can be an oval cylinder or rectangular box on wheels 150 (FIG. 1) with a hinged lid 130 that folds toward the Flightdeck when deployed.

The MASBC's main-housing can be made with a combination of firearms and/or IED resistant steel, high-grade polymer, alloy, and carbon-fiber.

FIG. 1 depicts a view from inside the forward galley when one embodiment of the rigid expandable panels MASBC is deployed and wedged into a female channel surrounding the forward galley/main cabin entrance. As shown in FIG. 1, when deployed the MASBC 100 is located between two bulkheads 105 of the aircraft from approximately the floor of the main cabin of the aircraft to approximately the ceiling of the main cabin of the aircraft. The MASBC has expandable rigid panels that wedge into a female channel 120 thereby making it exceptionally difficult for an attacker to tip the MASBC 100 over. The lower portion of the MASBC includes a main housing 135 and the main housing generally includes wheels 150 to easily move the MASBC for maintenance, stowage, and deployment. In upper portion of the MASBC may include a peep hole 140 to enable someone located on the cockpit side of the MASBC to see into the main cabin area. In some embodiments when deployed, the MASBC with rigid expandable panels may be locked into the aircraft or into the ceiling in ways familiar to one of ordinary skill in the art and as described in copending U.S. patent application Ser. No. 15/799,391 which is herein incorporated by reference in its entirety. The lower portion of the MASBC may be held in place through the use of retractable cables attached to the aircraft and a ratcheting system as further described with respect to FIG. 3.

FIG. 1 also shows a panic-button 145 and the scuttle-wheel 115 that expands the panels into the female channels. As shown in FIG. 1, an embodiment of the MASBC 100, may include rigid expandable panels 110 which may include a scuttle-wheel 115 on the forward galley side. The scuttle-wheel 115 may be used to expand the rigid panels 110 into a female channel 120. The scuttle-wheel 115 may also be used to retract the panels for stowage. FIG. 1 also shows a foot pedal 125 which is further explained below. FIG. 1 shows a possible location for the rigid female channel MASBC system's 100: wedged inside the main cabin and forward galley entrance.

FIG. 2 depicts a view from the passenger cabin (main cabin) when a second embodiment of a rigid expandable panels MASBC is deployed and wedged into a female channel 120 surrounding the forward galley/main cabin entrance. The MASBC 200 may also include one or more daylight and night-vision capable camera system 205 with a motion sensor that may wirelessly connect with a device viewable by one or more flight attendants and at least a second device viewable by one or more pilots. The lower portion of the MASBC may be held in place through the use of retractable cables attached to the aircraft and a ratcheting system as further described with respect to FIG. 3.

FIG. 3 depicts a view from the passenger cabin (main cabin) when a third embodiment, the non-porous soft curtain MASBC, is deployed. FIG. 3 shows the MASBC's folding-barrier may be made of soft non-porous curtain, which may be hung from the ceiling of the aircraft when deployed using ways familiar to one of ordinary skill in the art and as described in copending U.S. patent application Ser. No. 15/799,391 which is herein incorporated by reference in its entirety. A Mobile Aircraft Secondary Barrier Cart may also include a main housing being in the form of a mobile barrier cart 300 (FIG. 3); at least two retractable cables 305 attached to the main housing and configured to attach to at least two points 310 on an aircraft, at least one ratcheting system 315 configured to hold the main housing in place. When deployed, the curtain of the MASBC may be locked into the ceiling in ways familiar to one of ordinary skill in the art and as described in copending U.S. patent application Ser. No. 15/799,391 which is herein incorporated by reference in its entirety.

The soft non-porous barrier is attached to the main housing. In one embodiment the soft non-porous barrier may attach to the bulkheads in ways familiar to one of ordinary skill in the art and as described in copending U.S. patent application Ser. No. 15/799,391 which is herein incorporated by reference in its entirety. As shown in FIG. 3, the MASBC's main-housing is fastened into the aircraft's bulkhead 105, therefore, making it exceptionally difficult for an attacker to tip the MASBC over like a standard sustenance service trolley carts used for the current method. The MASBC may include a panic button 145 covered with a protective hinged cover.

The non-porous soft curtain barrier MASBC main-housing may include a ratcheting system (as fully described in copending U.S. patent application Ser. No. 15/799,391 which is herein incorporated by reference in its entirety) in order to stabilize and strengthen the MASBC's stability after deployment. The ratcheting system is preferably on the backside of the MASBC facing the Flightdeck. The ratcheting system may have a release lever to disengage the MASBC before stowage.

In this embodiment, the expandable panels 110 which are attached to the top portion of the MASBC are held in place by the sides of the MASBC's curtain (or panels) sliding into tracks located on the bulkheads of the aircraft. In some embodiments, the panels are rigid and wedge into female channels surrounding the main cabin/forward galley entrance.

When more than one rigid panel is used, the rigid panels are capable of being tightly ratcheted together either with a ratcheting hand scuttle-wheel winch 115 or a foot-pedal winch 125 system. In some embodiments, the rigid panels can be unlocked for stowage with a lever (not shown) that can be engaged by either an aircrew member's hand or foot.

In the case that the ratcheting system malfunctions and cannot be disengaged, an emergency "T"-handle Hex Key tool may be attached to the Flightdeck door side of the MASBC's main-housing and can be used to release the ratcheting system's locking mechanism.

Preferably, when a soft curtain us used, the soft curtain MASBC ratcheting system should be concave for easier stowage.

Inside of the MASBC may be an attached folding-barrier made of firearms and explosive fragment resistant steel, alloy, ceramic, carbon fiber, polymer, clear Plexiglas, or a cloth-type curtain or a cloth-type net; the folded barrier may be a combination of the aforementioned materials.

A rigid MASBC folding-barrier has to be tall enough to prevent an attacker from diving over it and into an unlocked Flightdeck.

An air carrier has the option to request that the MASBC's folding-barrier be projectile-proof from firearms or an IED.

Due to the numerous different types of aircraft and cabin configurations, the size of the MASBC's main-housing and folding-barriers vary.

The MASBC main-housing's height should be a minimum of 100 cm and width of 25 cm.

When deployed, the MASBC has a panic-button 145 covered with a protective hinged cover on the side that faces the forward galley. The panic-button would allow a crew-member to engage a very loud electronic alarm so that the pilot can lock the Flightdeck and emergency land.

The invention claimed is:

1. A Mobile Aircraft Secondary Barrier Cart comprising:
a main housing being in the form of a mobile barrier cart;
at least two retractable cables attached to said main housing and configured to attach to at least two points on an aircraft;
at least one ratcheting system configured to hold said main housing in place;
a curtain barrier designed to increase a height of said main housing when said curtain barrier is deployed; and
at least two tracks configured to be installed on bulkheads of an aircraft cabin of said aircraft wherein edges of said curtain barrier are inserted into said tracks to hold said curtain barrier in place.

2. The Mobile Aircraft Secondary Barrier Cart of claim 1 wherein said curtain barrier is resistant to explosives and small arms fire.

3. The Mobile Aircraft Secondary Barrier Cart of claim 1 wherein said curtain barrier comprises at least two panels; wherein said panels rise from said main housing and expand with the assistance of a spring-loaded deployment mechanism.

4. The Mobile Aircraft Secondary Barrier Cart of claim 3, wherein the spring-loaded mechanism is configured to be operated by an active duty flight attendant wherein said active duty flight attendant is able to manually expand the panels up to the bulkheads and ceiling of the aircraft cabin.

5. The Mobile Aircraft Secondary Barrier Cart of claim 1, wherein said curtain is a fragment-proof expandable and collapsible cloth-like soft material that is designed to be raised up from the main housing and locked into a ceiling and the bulkheads between the aircraft cabin and forward galley.

6. The Mobile Aircraft Secondary Barrier Cart of claim 1, configured to substantially enclose a main cabin/forward galley entrance wherein the curtain barrier is opaque.

7. The Mobile Aircraft Secondary Barrier Cart of claim 1, wherein the curtain barrier is an expandable rigid barrier comprising at least two firearms resistant panels.

8. The Mobile Aircraft Secondary Barrier Cart of claim 1, wherein said main housing unit contain systems that lock into attachments into surrounding forward galley area bulkheads.

9. The Mobile Aircraft Secondary Barrier Cart of claim 7, wherein said at least two firearms resistant panels in which at least one edge of said at least two firearms resistant panels are configured to wedge tightly into a female channel or V-channel built into the ceiling surrounding forward galley bulk-heads.

10. The Mobile Aircraft Secondary Barrier Cart of claim 7, wherein said said at least two firearms resistant panels in which its edges have male extensions that are configured to lock into female inputs built into surrounding forward galley bulk-heads.

11. The Mobile Aircraft Secondary Barrier Cart of claim 1, further including at least one mechanical lock configured to be placed on a Flightdeck door.

12. The Mobile Aircraft Secondary Barrier Cart of claim 1, further including at least one daylight and night-vision capable camera system that are configured to wirelessly connect with a device viewable by at least one flight attendant and at least a second device viewable by at least one pilot.

13. The Mobile Aircraft Secondary Barrier Cart of claim 1, wherein the viewable portion of said cart, when stowed, is configured to resemble a standard sustenance service trolley cart.

14. The Mobile Aircraft Secondary Barrier Cart of claim 1, further including a security system which is capable of alerting a crew member if an unauthorized person attempts to tamper with said cart.

15. The Mobile Aircraft Secondary Barrier Cart of claim 1, further including a motion-sensor configured to set off at least one of an audio and visual alarms if an individual person moves toward it while deployed.

16. The Mobile Aircraft Secondary Barrier Cart of claim 1, further including a compartment containing at least one dose of Naloxone antidote also known as NARCAN® wherein said compartment is accessible under a top hatch of the main housing unit.

17. The Mobile Aircraft Secondary Barrier Cart of claim 1, further including a hand scuttle-wheel located at an upper portion of said cart.

18. The Mobile Aircraft Secondary Barrier Cart of claim 1, further including at least one of a panic-button, a wireless smartphone or tablet, which are wirelessly connected to available networks that communicate with ground control and configured to manually or automatically sent a message to ground-control.

19. The Mobile Aircraft Secondary Barrier Cart of claim 9, wherein the panels are capable of being tightly ratcheted together either with a ratcheting hand scuttle-wheel winch or a foot-pedal winch system and wherein the panels are configured to be unlocked for stowage with a lever that are configured to be engaged by either an aircrew member's hand or foot.

* * * * *